Patented Aug. 21, 1928.

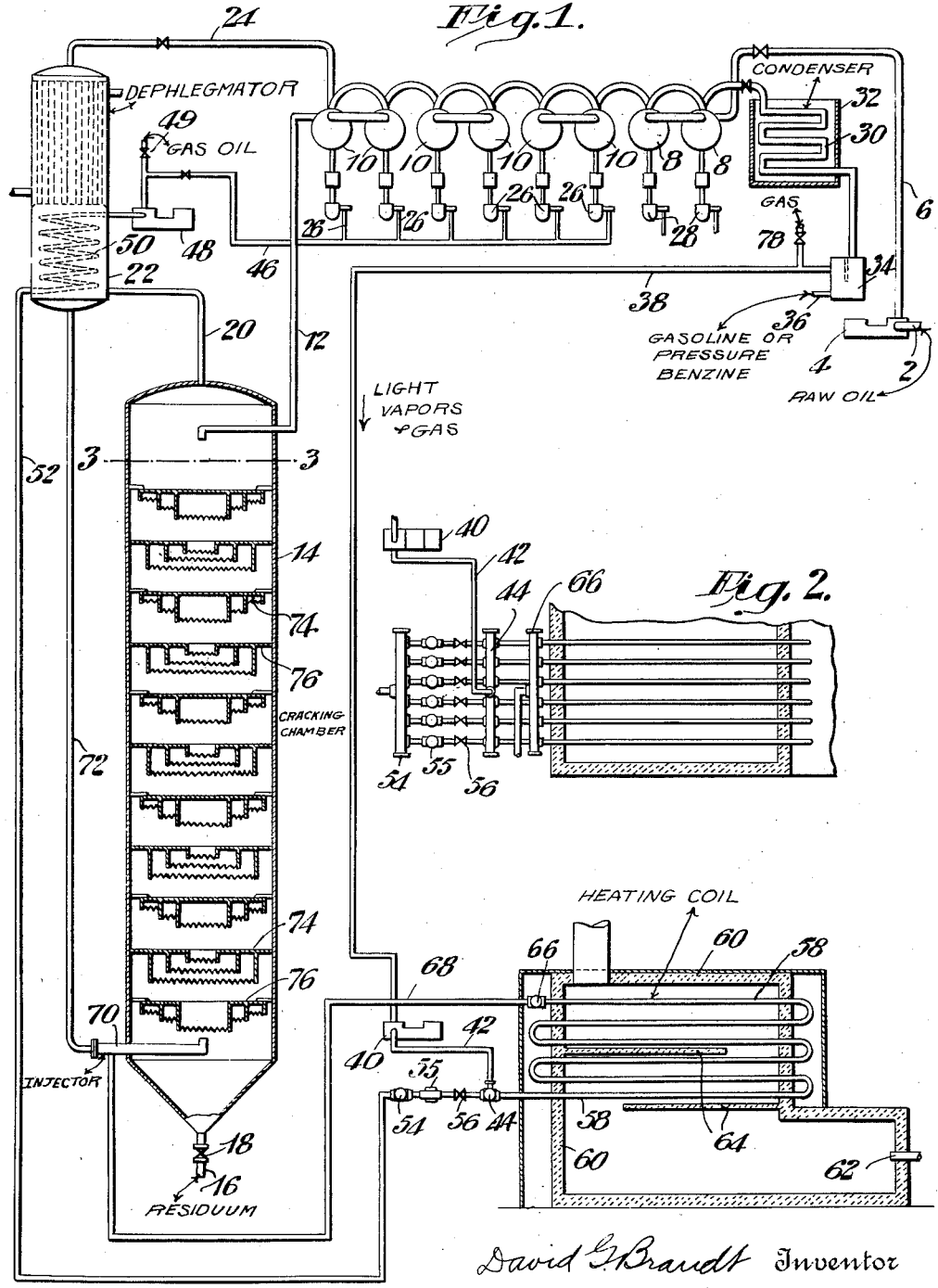

1,681,321

UNITED STATES PATENT OFFICE.

DAVID G. BRANDT, OF WESTFIELD, NEW JERSEY, ASSIGNOR TO DOHERTY RESEARCH COMPANY, OF NEW YORK, N. Y., A CORPORATION OF DELAWARE.

PROCESS AND APPARATUS FOR TREATING OIL.

Application filed March 23, 1922. Serial No. 545,974.

This invention relates to a process and apparatus for treating oil, and more specifically to a process and apparatus whereby a heavy hydrocarbon oil is cracked to produce gasoline with a minimum production of undesired oil fractions.

The present invention is based upon the application of the well known principle of mass action, which has been found to be applicable to the production of gasoline from heavier oils, in the same way as in reactions in inorganic chemistry. In inorganic chemical reactions, particularly as applied to reactions taking place in aqueous solutions, the reacting masses and reaction products are intimatedly mixed and associated, and equilibrium is generally attained within a short period of time. When the product of the reaction which is desired is insoluble, and also when the product desired is gaseous, and therefore readily separately removed from the sphere of the reaction, there is a substantially complete reaction attained, and one or more of the products entering into the reaction is used up. Such is the case, for instance, in the formation of the insoluble silver chloride from a solution of silver nitrate and sodium chloride, which takes place according to the following equation:

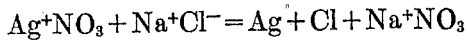

The relation existing between the silver and chlorine ions in the solution, and the silver chloride present in the form of dissolved undissociated salt is expressed by the mass action formula as follows:

$$K = \frac{Ag^+ \times Cl^-}{AgCl}$$

In the case of the liberation of carbonic acid from the interaction of sodium carbonate and hydrochloric acid, for instance, the carbonic acid breaks up into carbon dioxide and water and the former may be removed from the sphere of the reaction so that it may run substantially to completion.

In the case of the formation of light oils from heavier hydrocarbon oils the application of the law of mass action is not so simple.

It is well known that when a hydrocarbon distillate such as kerosene or a heavy oil is heated in a bomb under pressure and at a temperature high enough to produce cracking, and for a sufficient length of time for the cracking reaction to take place, there is formed therefrom a series of hydrocarbons ranging from permanent gas hydrocarbons to the heavy tar oils. It is apparent that in the reaction in which beside the lighter hydrocarbon oils, heavier hydrocarbon oils are produced from a light oil, such as kerosene there must be a polymerization of hydrocarbons which takes place in addition to the cracking operation.

It is believed that the above well established phenomenon can be explained in the light of the law of mass action as applied to inorganic chemistry, and it is an extension of the theory of the mechanism of the reaction by which these hydrocarbons are produced that the present invention is based upon.

It is well known that organic substances do not ionize, and therefore in their interactions they do not in general follow the law of mass action which is applied only to ionized substances. It is apparent, however, from the fact that irrespective of the hydrocarbon starting material employed in the bomb experiments above referred to, the same range of hydrocarbon distillates is always produced, and also from the fact that the constituents of the products are present in more or less the same proportions, that in the cracking reactions there must be a certain effect of the various hydrocarbons upon each other due to their presence, as they are formed so as to prevent the formation of one particular constituent greatly in excess of others. It does not seem likely that the hydrocarbons in their ordinary molecular state would have such an effect upon each other, and it is believed that at the high cracking temperatures employed the various hydrocarbons dissociate more or less into hydrocarbon radicals. These hydrocarbon radicals have presumably free bonds or valences through which the radicals unite, when the temperature is lowered, either with free hydrogen or with other radicals to produce complete hydrocarbon molecules. It seems reasonable to assume that while at the high temperatures the radicals react toward each other in the same way as ions in a solution. That is, there is an equilibrium set up between the hydrocarbon molecules which at the temperature are being transformed into radicals, and radicals which are recombining to form the hydrocarbon molecules. It would seem from the above considerations that the constituents follow a law similar to the law of mass action as applied to ions. It would seem probable, for instance, that on heating propane to a cracking temperature so that ethyl and methyl radicals would be formed, that at equilibrium conditions the amounts of the constituents could be expressed as follows:

$$K = \frac{C_2H_5- \times CH_3-}{CH_3C_2H_5}$$

To find the value of the constant K in the equation or to prove that such a condition exists would be very difficult of experimental proof. Facts which have been experimentally established, however, and which will be again referred to, indicate that there is some such relation between the constituents as set forth in the above equation.

The individual hydrocarbons produced in a cracking reaction are mutually soluble in each other and when subjected to distillation the various individual members pass over together in certain proportions depending upon the vapor pressures of the various constituents and the proportions of each present. It is not possible therefore to separate any individual member from the sphere of the reaction while the reaction is in progress so as to have the reaction run in the direction to form this individual member. It has been found, however, that by the addition of certain constituents during a cracking operation the formation of these particular constituents can be prevented to a large extent. The theory of operation of this phenomenon can be explained by analogy to certain reactions in inorganic chemistry.

In the formation of silver chloride it is possible through the operation of the law of mass action to more completely remove the silver chloride by rendering it more insoluble through the addition of a common ion.

Applying the law in the case of silver chloride the product of the ions divided by the dissolved undissociated silver chloride in a solution is a constant, expressed thus:

$$K = \frac{Ag^+ \times Cl^-}{Ag\,Cl\ (\text{dissolved undissociated})}$$

Now if a compound having a common ion such for instance as NaCl is added to the solution, then the concentration of the Cl⁻ ion is increased and the concentration of the $Ag^+$ must therefore decrease in order to have K remain constant according to the law. The Ag ions unite therefore with Cl ions and dissolved undissociated AgCl is formed, but the amount of the latter called for by the equation above is then exceeded, and more of the insoluble precipitate of silver chloride is therefore formed.

In the application of the same principle to the formation of gasoline from heavy hydrocarbon oils if it be possible to pass the undesired constituents from a previous reaction into the sphere of the present reaction, then in order to produce equilibrium between the various constituents there will be a corresponding decrease in the formation of the undesired constituents which have been added, and a corresponding increase in the formation of the desired constituent. If, for instance, during the cracking of a heavy oil to produce gasoline a large amount of permanent gas and gas oil or kerosene be passed into the zone of the reaction while cracking is taking place, then there should be very little permanent gas and gas oil or kerosene formed, but there should be a proportionately large yield of the constituent absent from the reaction mixture, which in this case is the gasoline constituent.

It should therefore be possible by the application of the above principles to convert the major portion of the heavy oil employed for cracking into gasoline, with the formation of only small portions of undesired products. The difficulty of attaining a satisfactory commercial application of the principles above outlined is apparent from a consideration of the prior art. Although the principles referred to as applied to inorganic chemistry have been known for a great many years, they have not found practical commercial application as applied to oils, or the production of gasoline, as far as I am aware.

In the prior art it has been attempted to make use of permanent gases produced by cracking in various ways. In the British patent to Leffer, 19,051, of 1912, for instance, the permanent gases produced by cracking are utilized to carry the vapors in the still to a condenser, and also to produce pressure on the liquid in the still so as to raise its boiling-point. It is to be noted, however, that the gases which are returned are not in intimate contact with the particles of liquid during the cracking operation and are substantially therefore out of the zone of reaction. It would not operate therefore nor was it intended to operate to prevent the formation of permanent gases in the reaction zone during the cracking operation.

It is the primary object of the present invention to provide a process and apparatus for the production of gasoline from high boiling-point hydrocarbon oils with a minimum simultaneous formation of undesirable reaction products.

In accordance with this object, one feature of the invention contemplates the introduction of permanent gases and a low-boiling distillate heavier than gasoline heated to a high temperature into a reaction zone in which heavy oil is cracked to produce gasoline.

Another object of the invention is to provide a process and apparatus in which the deposition of carbon is avoided during the heating operation.

In accordance with this object another feature of the invention consists in the provision of separate apparatus in which the heating and cracking takes place, these being so arranged that no heat is supplied to the apparatus in which the oil is being cracked. In accordance with this object another feature of the invention contemplates heating permanent gases and kerosene or gas oil in such a manner as to prevent deposition of carbon, and to impart the heat of these gases or light distillates to the heavy oils undergoing cracking.

Another object of the invention is to provide a process and apparatus which will crack heavy oils more economically and efficiently than any heretofore devised.

The various features of the invention are illustrated in the accompanying drawings, in which;

Fig. 1 is a diagrammatic view in elevation of an apparatus, parts of which are shown in section, wherein may be effected the process embodying the preferred form of the invention;

Fig. 2 is a plan view of a pipe coil employed for heating permanent gases and low boiling hydrocarbons.

To carry out the process of the invention in connection with the apparatus shown in the drawings a heavy oil such as fuel oil or crude received by a pipe 2 is forced under pressure by a pump 4 through pipe 6 into condensers 8 and 10, in which the oil is preheated during its passage therethrough by a heat transfer from vapors passing through the condensers in a path countercurrent to the path of flow of the incoming oil. The oil in passing through the condensers is preheated to a temperature of approximately 450° F. and is conducted by means of pipe 12 into the upper portion of a cracking chamber 14 in which is maintained a body of heavy oil. In order to prevent deposition of carbon on the walls of the cracking chamber, heat is supplied to the body of oil by circulating high temperature gases and vapors therethrough. It is well known that an obstructive deposition of carbon generally takes place on the portion of the metal surfaces of a cracking still which is directly heated. As oil is a fairly poor conductor of heat, more or less local overheating takes place at the point of contact of oil with the heated surfaces, and a deposition of carbon generally takes place upon the metal or side walls of the cracking chamber and results in a low heat transfer, and so necessitates a frequent scraping or cleaning of the walls to which the carbon or coke has been attached. By supplying the heat necessary for cracking in the cracking chamber by a direct contact with a hydrocarbon vapor medium which has been heated to the required temperature, the cracking of the heavy oil is effected without the obstructive deposition of carbon taking place. As the cracking in the chamber 14 progresses, more or less tarry matter and coke settle in the chamber and may be withdrawn from time to time through a pipe 16 having a valve 18. Vapors which are released in the oil body pass upwardly through the oil and into a pipe 20 from which they are led to a water-cooled dephlegmator 22 in which the heaviest portions of the vapor are removed. The uncondensed portion of the vapor which passes through the dephlegmator is led by means of a pipe 24 into a series of condensers 10 in which the next heavier fraction of the hydrocarbon vapors becomes condensed and from which it may be removed through traps 26. The next heavier hydrocarbon fraction condenses in condensers 8 and may be removed therefrom through traps 28 and may then be passed to storage. A still lighter fraction consisting mainly of gasoline is condensed in pipe 30 in condenser 32. This gasoline together with noncondensible vapors, or so called permanent gases, is led to a separator 34 which serves to substantially completely separate the noncondensible vapors from the gasoline. Gasoline may be withdrawn from the separator 34 through a pipe 36.

The non-condensible vapors are passed by means of pipe 38, connected to separator 34, to a pump 40 from which they are passed under pressure through a pipe 42 to a manifold 44, and from thence are distributed through a series of heating pipe coils 58. The oil fraction which is separated in condensers 10 consists generally of kerosene or gas oil, depending upon the temperature at which the condensers are maintained. This kerosene or gas oil is passed from traps 26 through a pipe 46 to a pump 48. To this oil is added kerosene or gas oil from storage which enters through a pipe 49 and the mixture is forced through a coil 50 into the dephlegmator 22, where the kerosene or gas oil becomes preheated by the heat of the vapors received from the cracking still. From the coil 50 the preheated kerosene or gas oil is passed through pipe 52 to a manifold 54 from which the oil is passed through a series of meters 55 and valves 56 to be uniformly distributed in each of the coils 58. The valves 56 are connected with the gas manifold 44 so that a definite amount of gas is mixed with the oil as the oil passes through the manifold 44.

The mixture of light oil and gas is completely vaporized within the heating coils 58 by raising the oil to a sufficiently high temperature while under pressure. The pressure is so regulated that the temperature of the oil vapors within the coils is substantially the cracking temperature of the light oil being vaporized, but the temperature of the vapor and gases is much higher than the cracking temperature of the heavy oil held within the cracking chamber 14. To vaporize the light oils, the coils 58 are positioned within a furnace 60, which is heated by means of an oil burner 62. The combustion products pass through the furnace around a series of baffles 64, the combustion products passing in substantially parallel path with the circulation of the oil and gas through the coils. The vaporized oil and gas from the coils 58 collect in a manifold 66, and then pass through a pipe 68 to an injector 70, where they meet the condensates conducted by a pipe 72 from the condenser 22, and the mixture is then passed into the body of oil in the bottom of the cracking chamber 14. The mixture of oil and vapors is circulated through the coils 58 at such a high velocity that there will be substantially no cracking within the coils, and therefore the deposition of tar, coke and carbon will be a minimum.

The volume of oil vapor and gas mixture introduced into the bottom of the cracking chamber 14 is sufficient to maintain the temperature of the oil in the cracking chamber at substantially a temperature of from 750° to 800° while under a pressure of 85 pounds to 100 pounds per square inch. This temperature may vary widely in accordance with the character of the oil, but it is necessary that the volume of the superheated vapors entering the cracking chamber must maintain the oil in the cracking chamber at a sufficiently high temperature, so that the lighter oils such as gasoline or kerosene will not condense within the cracking chamber. If this condensation should take place the gravity of the oil body would be raised to such a point that the superheated vapors would not have a sufficiently high temperature for cracking the oil. The temperature of the gas and vapor mixture is preferably about 1000° to 1100° F.

To obtain an effective cracking of the oil within the chamber 14 a series of baffles 74 and 76 are placed within the chamber 14 to force the gases in a circuitous path in rising through the oil body. The baffles 74 and 76 are provided with a series of downwardly projecting cylinders having their lower edges serrated in order to break up the gas into fine streams and assist in getting an intimate distribution of the gas throughout the oil body. It is preferred to maintain a vapor space within the cracking chamber 14 whereby the gas and cracked oil vapors may be separated from the oil before they pass through the pipe 20 into the dephlegmator 22. Accordingly, the oil level in the chamber 14 is maintained substantially at the point indicated by the dot and dash line 3—3.

It will be understood, as stated in my prior application filed Jan. 31, 1922, Serial No. 532,958, for "distillation of oil", that the cracking chamber 14 may be lagged or insulated to prevent the loss of heat.

By mixing gas with the light oil vapors which are being circulated through the heating coils 58 the oil and gas may be heated to a higher temperature and more completely vaporized without the danger of depositing carbon within the coils. Furthermore, the presence of the still gases with the oil vapors tends, by analogy to the laws of mass action to hold back the formation of these gases during the vaporization of the oil within the coils and during the cracking of the oil within the chamber 14. Furthermore, the gas acts as an agitating medium for distributing the heat throughout the oil cracking body and for carrying the heat into the oil body. Also, the gas permits a lower pressure to be maintained in the cracking chamber, in order to accomplish the cracking of the heavy oil and the gas immediately sweeps the cracked vapors out of the oil as they are formed. The gas is circulated in a closed cycle and is accumulative during the oil vaporizing and the oil cracking stages. The excess of gas over that necessary for circulation through the heating coils is removed from the pipe 38 through a draw-off pipe 78.

Having thus described the preferred form of the invention, what is claimed as new is:

1. A process of cracking high boiling-point hydrocarbons to form low boiling-point hydrocarbons comprising maintaining a body of high boiling-point oil under pressure, vaporizing a lower boiling-point oil in contact with vapors, said lower boiling point oil having a relatively narrow boiling point range and said vapors being of the type that remain uncondensed after passing through the ordinary gasoline condenser, passing the mixed vapors through the body of high boiling point oil to crack the oil, condensing undesired fractions from vapors leaving the high boiling-point oil and mixing this condensate with similar boiling-point oil to form said lower boiling point oil for the process.

2. A process of producing low boiling-point hydrocarbons from high boiling-point hydrocarbons comprising maintaining a body of high boiling-point hydrocarbons under pressure, vaporizing a lower boiling-point hydrocarbon in contact with non-condensible hydrocarbon vapors under pressure and at a temperature sufficiently high to produce cracking of the high boiling-point hydrocarbons, passing the mixed vapors into intimate contact with the said high boiling-point oil for a time interval sufficient to produce cracking thereof, condensing and removing the desired low boiling-point hydrocarbon fractions, and returning the non-condensible hydrocarbon vapors together with the undesirable low boiling-point hydrocarbons to be recirculated in the process.

3. A method for the production of light hydrocarbons from heavy hydrocarbons, which comprises preheating heavy hydrocarbons by means of the heat of outgoing vapors, passing the heavy hydrocarbons to a cracking zone to contact therein with hydrocarbons at a higher temperature to produce light hydrocarbons therefrom, withdrawing the light hydrocarbons produced and condensing the heavier portions thereof, passing the condensed portion back to the cracking zone to be further cracked, and the uncondensed portion to a cooling zone to condense a condensible light hydrocarbon corresponding to kerosene or gas oil, separating such kerosene or gas oil from the uncondensed portion, condensing another portion of hydrocarbons corresponding to the gasoline fraction and separating it from the non-condensed fraction, passing the non-condensed fraction, together with the kerosene or gas oil fraction in fine streams into a heating zone to be heated to a high temperature and passing it into the cracking zone and repeating the cycle.

4. A method for the production of light hydrocarbons from heavy hydrocarbons which comprises preheating heavy hydrocarbons under pressure to about 450° F. by means of heat transfer from vapors undergoing condensation, passing the heavy hydrocarbons to a cracking zone to contact therein with hydrocarbons at a temperature of from 750° to 800° F. to produce cracking of said heavy hydrocarbons, withdrawing the vapors produced, condensing the heaviest fraction of the vapors and returning them to the cracking zone, condensing the next heavier fraction of the vapors and preheating this portion by means of heat transfer from the said vapors, and rapidly passing this portion in fine streams through a heating zone at a temperature of from 1000° to 1100° F. and from thence into the cracking zone, condensing the remaining condensible portion of the said vapors and passing the portion remaining uncondensed through the said heating zone in contact with the fraction passing therethrough and passing the same together therewith into the cracking zone.

5. In an apparatus of the kind described, a cracking chamber, means for preheating oil, a conduit for leading oil from the preheating means to the said cracking chamber, a dephlegmator, means for passing vapors from the said cracking chamber to the dephlegmator, and means for returning vapors condensed in the dephlegmator to the cracking chamber, a series of condensers, means for conducting vapors from the dephlegmator to the condensers, means for separating the heavier portion of the vapors condensed in the condensers and passing it through the dephlegmator to be preheated and from thence to a heating coil, means for passing uncondensed vapors from the condensers to the said heating coil, means for heating the said coil, and means connecting the said heating coil with the cracking chamber.

In testimony whereof I affix my signature.

DAVID G. BRANDT.